May 26, 1959 A. F. PERRINI ET AL 2,888,095
AIR FILTER
Filed Nov. 15, 1956
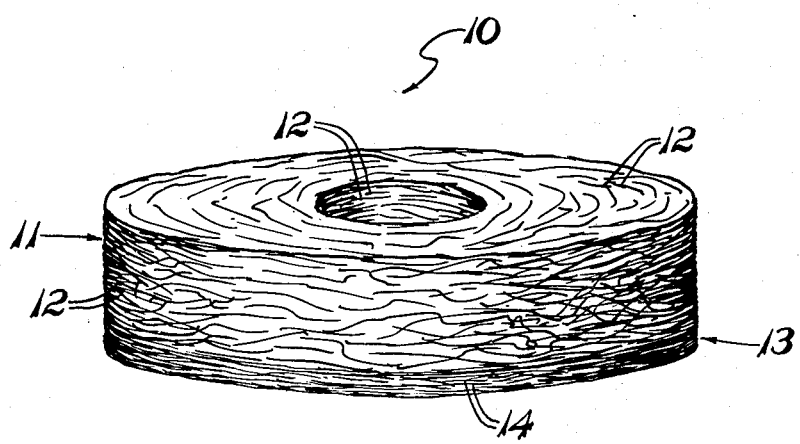
INVENTORS
AMERICO F. PERRINI
BY JOHN L. GRETZ
ATTY.

United States Patent Office 2,888,095
Patented May 26, 1959

2,888,095
AIR FILTER

Americo F. Perrini, Bridgeport, Conn., and John L. Gretz, Alexandria, Va., assignors to The B. F. Goodrich Company, New York, N.Y., a corporation of New York Application November 15, 1956, Serial No. 622,359

10 Claims. (Cl. 183—45)

This invention relates to a filter and pertains more particularly to an air filter for removing dust particles from air before the air is introduced into the carburetor or fuel injection system of an internal combustion engine.

Since dust particles normally in the air if drawn with the air into the carburetor or fuel injection system of an internal combustion engine tend to restrict or plug small passageways in the carburetor or fuel injection system of the engine and cause the cylinder walls and pistons of the engine to wear excessively, it is customary to filter the air to remove as many of the dust particles as possible from the air before the air enters the carburetor or fuel injection system of the engine. The filtering of the air usually is accomplished by drawing the air through a filter element in which the dust particles are "entrapped." A filter element used for this purpose must not only be able to effectively filter substantially all of the dust particles from the air during normal operation of the engine but also must retain its filtering efficiency over long periods of operation so that frequent cleaning of the filter is not required. To be satisfactory the filter also must not restrict objectionably the flow of air into the carburetor or fuel injection system of the engine. Among the filter constructions heretofore proposed for filtering air before its use in internal combustion engines is a filter element comprised of randomly dispersed animal hair. However, filter elements made of animal hair have not been considered entirely satisfactory since such filters heretofore have not possessed all of the requisite characteristics of a satisfactory air filtering medium.

The present invention relates to a filter element comprised of randomly dispersed natural or synthetic fibers or blends thereof which possesses all of the characteristics required of an air filter for use in conjunction with the carburetor or fuel injection system of an internal combustion engine. The filter element of this invention is a laminated construction comprised of a relatively thick layer of relatively coarse natural or synthetic fibers or a blend thereof and a relatively thin layer of relatively fine natural or synthetic fibers or a blend thereof, as more fully explained hereinafter.

The invention is illustrated in the drawings in which the single figure is a perspective view of a filter element made in accordance with this invention. However, it will be understood that the invention is not intended to be limited to the specific embodiment of the invention shown in the drawing.

Referring to the drawing, the filter element 10 is a laminated structure which comprises a layer 11 of open-mesh randomly dispersed relatively coarse fibers 12, 12 and a layer 13 of open-mesh randomly dispersed relatively fine fibers 14, 14.

The coarse fibers 12, 12 used in layer 11 of the filter element 10 have a fiber diameter of about .003 to .020 inch and may be either natural or synthetic fibers or a blend thereof. Among the natural fibers having the desired coarseness are fibers of animal origin such as hog hair, cattle hair and horse hair and fibers of vegetable origin such as coconut fiber (coir) and sisal hemp. The synthetic fibers which can be used in layer 11 may be any synthetic fibers which can be used in layer 11 may be any synthetic fiber drawn to the desired coarseness including by way of illustration nylon fibers, viscose rayon fibers, casein fibers, asbestos fibers, glass fibers and metal fibers.

The fine fibers 14, 14 used in layer 13 of the filter element 10 have a fiber diameter of about .0006 to .0015 inch and may be either natural or synthetic fibers or a blend thereof. Of the natural fibers having the necessary fineness for use in layer 13, natural (virgin) or reprocessed wool has proven particularly suitable. Any of the synthetic fibers drawn to the required fineness may be used in layer 13 including by way of illustration Dynel fibers (made from a copolymer resulting from the copolymerization of 40% acrylonitrile and 60% vinyl chloride), viscose rayon fibers, glass fibers, nylon fibers and casein fibers.

Although it is not necessary, it is desirable that fibers 12, 12 and fibers 14, 14 be curled or crimped to increase the natural bond between adjacent fibers of the fibrous webs from which layers 11 and 13 are formed and, if a natural curl is not present in the fibers used to form layers 11 and 13, the fibers may be mechanically curled or crimped to impart the desired effect.

In the manufacture of filter element 10, fibers 12, 12 are formed into an open-mesh or reticulated fibrous web or batt having a thickness equal to the thickness of layer 11 and fibers 14, 14 are formed into an open-mesh or reticulated fibrous web or batt having a thickness equal to the thickness of layer 13, the fibrous webs being formed in the usual manner using techniques well known in the textile industry. Preferably the webs of fibers are treated with a suitable binder material to adhere at least some of the fibers of the web together at their points of crossing and to provide a coating of binder over the individual fibers of the web. Natural and synthetic latices including aqueous dispersions of thermoplastic resinous materials such as aqueous dispersions of polyvinyl chloride, polyvinylidene chloride or polyethyl acrylate have been found particularly useful as binders for the fibers because they can be applied without the use of volatile solvents and can be conveniently handled. Since filter elements such as filter element 10 are cleaned usually by immersing the filter element in kerosene or oil and since such filter elements usually are dipped in oil after cleaning to coat the filaments of the filter with a film of oil and thereby increase the tendency of dust particles to adhere to the filaments of the filter element, the binder preferably is an oil-resistant material such as neoprene (chloroprene) rubber, a rubbery copolymer of acrylonitrile and butadiene, or polyvinyl chloride.

The respective webs of fibrous material (one comprised of the relatively coarse fibers 12, 12 and the other comprised of the relatively fine fibers 14, 14) are trimmed or cut, if necessary, to the desired shape and are assembled together, the two layers 11 and 13 being adhered together with a suitable adhesive if desired. If an adhesive is used to bond layers 11 and 13 together, the same materials useful as binders for the fibers of layers 11 and 13 may be employed.

The thicknesses of layers 11 and 13 for optimum operation may vary depending upon the size of engine with which the filter element 10 is intended to be used. However, the thickness of layer 11 usually should be about one to four inches, preferably a thickness of about two to three and one-half inches, and the thickness of layer 13 usually should be about one-tenth to one-half inch, preferably a thickness of about one-tenth to one-quarter inch. The amount of fibrous material used per unit volume in layers 11 and 13 to obtain optimum filtering also may vary depending upon the size of engine with which the filter element is to be used, but preferably the density of the web of fiber material (without binder) in layer 11 is about one-half to two and one-half pounds per cubic foot and the density of the web of fiber material (without binder) in layer 13 is about one to two and one-half pounds per cubic foot. If a binder is used to bond together and coat the fibers of layers 11 and 13, the density of the fibrous material (with binder) of layer 11 preferably is about one to five pounds per cubic foot and the density of the fibrous material (with binder) of layer 13 preferably is about two to five pounds per cubic foot.

The following specific illustration will serve to more fully illustrate this invention.

A filter element comprised of a layer of hog hair and a layer of natural (virgin) wool was made in the following manner.

A web of open-mesh entangled hog hair about 2 3/10 inches thick and having a density of about 0.7 pound per cubic foot was formed in the usual manner. The fibrous web then was sprayed with a vulcanizable neoprene latex composition (an aqueous dispersion of a chloroprene polymer containing a vulcanizing agent and other compounding ingredients if desired) and the impregnated web was heated to dry and vulcanize the neoprene composition coated over the fibers of the web. The weight of the rubberized hair of the web was about 50% greater than the weight of the web before it was treated with the neoprene latex binder. A web of open-mesh entangled wool hair about 1/4 inch thick and having a density of about 1.9 pounds per cubic foot then was formed and was rubberized with neoprene binder in the same manner as the web of hog hair, the weight of the rubberized wool being about 50% greater than the weight of the wool before being treated with the neoprene binder composition. An annular segment 8 1/4 inches across with a 1 5/8 inches opening in the center was cut from each web of rubberized hair and the two segments were adhered together in face-to-face relationship with a suitably compounded neoprene rubber adhesive to form the filter element.

The filter element so formed removed 93 percent of dust particles from air drawn through the filter at the rate of 50 cubic feet per minute and 96 percent of dust particles from air drawn through the filter at the rate of 150 cubic feet per minute. Oil coated on the rubberized fibers of the filter to increase the tendency for dust particles to adhere to the fibers was not drawn through the filter at rates of air flow through the filter below 290 cubic feet per minute. Other characteristics of the filter also were considered to be quite satisfactory.

While the filter element shown and described herein is annular in shape, it will be understood that the filter element may have a configuration other than annular.

It is clear that many variations and modifications of this invention may be made without departing from the spirit and scope of the invention as defined in the appended claims.

We claim:

1. An air filter for use in conjunction with the carburetor or fuel injection system of an internal combustion engine which comprises a layer of open-mesh randomly dispersed fibers having a fiber diameter of about .003 to .020 inch, and a layer of open-mesh randomly dispersed fibers having a fiber diameter of about .0006 to .0015 inch, the said fibrous layers being disposed in face-to-face relationship.

2. An air filter for use in conjunction with the carburetor or fuel injection system of an internal combustion engine which comprises a layer of open-mesh randomly dispersed fibers having a fiber diameter of about .003 to .020 inch, the density of said fibers in said fibrous layer being about 1/2 to 2 1/2 pounds per cubic foot, and a layer of open-mesh randomly dispersed fibers having a fiber diameter of about .0006 to .0015 inch, the density of said fibers in the second-mentioned fibrous layer being about 1 to 2 1/2 pounds per cubic foot, the said fibrous layers being disposed in face-to-face relationship.

3. An air filter for use in conjunction with the carburetor or fuel injection system of an internal combustion engine which comprises a layer from about one to four inches thick of open-mesh randomly dispersed fibers having a fiber diameter of about .003 to .020 inch, and a layer from about 1/10 to 1/2 inch thick of open-mesh randomly dispersed fibers having a fiber diameter of about .0006 to .0015 inch, the said fibrous layers being disposed in face-to-face relationship.

4. An air filter for use in conjunction with the carburetor or fuel injection system of an internal combustion engine which comprises a layer from about 2 to 3 1/2 inches thick of open-mesh randomly dispersed fibers having a fiber diameter of about .003 to 0.20 inch, and a layer from about 1/10 to 1/4 inch thick of open-mesh randomly dispersed fibers having a fiber diameter of about .0006 to .0015 inch, the said fibrous layers being disposed in face-to-face relationship.

5. An air filter for use in conjunction with the carburetor or fuel injection system of an internal combustion engine which comprises a layer from about one to four inches thick of open-mesh randomly dispersed fibers having a fiber diameter of about .003 to .020 inch, the density of said fibers in said fibrous layer being about 1/2 to 2 1/2 pounds per cubic foot, and a layer from about 1/10 to 1/2 inch thick of open-mesh randomly dispersed fibers having a fiber diameter of about .0006 to .0015 inch, the density of said fibers in the second-mentioned fibrous layer being about 1 to 2 1/2 pounds per cubic foot, the said fibrous layers being disposed in face-to-face relationship.

6. An air filter for use in conjunction with the carburetor or fuel injection system of an internal combustion engine which comprises a layer of open-mesh randomly dispersed fibers having a fiber diameter of about .003 to .020 inch, said fibers of said fibrous layer being coated with and bonded together at at least some of their points of crossing with a binder composition, and a layer of open-mesh randomly dispersed fibers having a fiber diameter of about .0006 to .0015 inch, the said fibers of the second-mentioned fibrous layer being coated with and bonded together at at least some of their points of crossing with a binder composition, the said fibrous layers being disposed in face-to-face relationship.

7. An air filter for use in conjunction with the carburetor or fuel injecton system of an internal combustion engine which comprises a layer from about one to four inches thick of open-mesh randomly dispersed fibers having a fiber diameter of about .003 to .020 inch, the density of said fibers in said fibrous layer being about 1/2 to 2 1/2 pounds per cubic foot, said fibers of said fibrous layer being coated with and bonded together at at least some of their points of crossing with a binder composition, the density of said fibers coated with binder composition in said fibrous layer being about one to five pounds per cubic foot, and a layer from about 1/10 to 1/2 inch thick of open-mesh randomly dispersed fibers having a fiber diameter of about .0006 to .0015 inch, the density of said fibers in the second-mentioned fibrous layer being about 1 to 2 1/2 pounds per cubic foot, said fibers of the second-mentioned fibrous layer being coated with and bonded together at at least some of their points of crossing with a binder composition, the density of said fibers coated with binder composition in the second-mentioned fibrous layer being about two to five pounds per cubic foot, the said fibrous layers being disposed in face-to-face relationship.

8. An air filter for use in conjunction with the carburetor or fuel injection system of an internal combustion engine which comprises a layer of open-mesh randomly dispersed fibers having a fiber diameter of about .003 to .020 inch, the density of said fibers in said fibrous layer being about ½ to 2½ pounds per cubic foot, and a layer of open-mesh randomly dispersed wool fibers, the density of said wool fibers in the second-mentioned fibrous layer being about 1 to 2½ pounds per cubic foot, the said fibrous layers being disposed in face-to-face relationship.

9. An air filter for use in conjunction with the carburetor or fuel injection system of an internal combustion engine which comprises a layer from about one to four inches thick of open-mesh randomly dispersed fibers having a fiber diameter of about .003 to .020 inch, and a layer from about 1/10 to ½ inch thick of open-mesh randomly dispersed wool fibers, the said fibrous layers being disposed in face-to-face relationship.

10. An air filter for use in conjunction with the carburetor or fuel injection system of an internal combustion engine which comprises a layer from about one to four inches thick of open-mesh randomly dispersed fibers having a fiber diameter of about .003 to .020 inch, the density of said fibers in said fibrous layer being about ½ to 2½ pounds per cubic foot, said fibrous layer being coated with and bonded together at at least some of their points of crossing with a binder composition, the density of said fibers coated with binder composition in said fibrous layer being about one to five pounds per cubic foot, and a layer from about 1/10 to ½ inch thick of open-mesh randomly dispersed wool fibers, the density of said wool fibers in the second-mentioned fibrous layer being about 1 to 2½ pounds per cubic foot, said wool fibers of the second-mentioned fibrous layer being coated with and bonded together at at least some of their points of crossing with a binder composition, the density of said wool fibers coated with binder composition in the second-mentioned fibrous layer being about two to five pounds per cubic foot, the said fibrous layers being disposed in face-to-face relationship.

References Cited in the file of this patent

UNITED STATES PATENTS

| | | |
|---|---|---|
| 342,099 | Howe | May 18, 1886 |
| 2,019,241 | Weiss | Oct. 29, 1935 |
| 2,138,874 | Myers | Dec. 6, 1938 |
| 2,231,076 | Lake et al. | Feb. 11, 1941 |
| 2,582,915 | Sebok | Jan. 15, 1952 |
| 2,629,459 | Hammond et al. | Feb. 24, 1953 |
| 2,692,654 | Pryor | Oct. 26, 1954 |
| 2,772,195 | Gaarder | Nov. 27, 1956 |

FOREIGN PATENTS

| | | |
|---|---|---|
| 443,965 | Great Britain | Mar. 4, 1936 |